(12) United States Patent
Pandy et al.

(10) Patent No.: US 10,050,297 B2
(45) Date of Patent: Aug. 14, 2018

(54) METHOD AND SYSTEM FOR OPERATING A FLOW BATTERY SYSTEM BASED ON ENERGY COSTS

(71) Applicant: United Technologies Corporation, Hartford, CT (US)

(72) Inventors: Arun Pandy, Manchester, CT (US); Michael L. Perry, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 521 days.

(21) Appl. No.: 14/509,685

(22) Filed: Oct. 8, 2014

(65) Prior Publication Data

US 2015/0024296 A1    Jan. 22, 2015

Related U.S. Application Data

(62) Division of application No. 13/022,285, filed on Feb. 7, 2011, now Pat. No. 8,884,578.

(51) Int. Cl.
*H01M 8/18*    (2006.01)
*H01M 8/20*    (2006.01)
(Continued)

(52) U.S. Cl.
CPC ....... *H01M 8/188* (2013.01); *H01M 8/04925* (2013.01); *H01M 8/04992* (2013.01);
(Continued)

(58) Field of Classification Search
CPC .... H01M 8/188; H01M 8/20; H01M 8/04992; H01M 8/04925; H01M 10/44;
(Continued)

(56) References Cited

U.S. PATENT DOCUMENTS 7,078,118 B2    7/2006  Schrooten et al.
7,261,962 B1    8/2007  Czajkowski et al.
(Continued)

FOREIGN PATENT DOCUMENTS

GB    2455421     6/2009
JP    2008029104  2/2008

OTHER PUBLICATIONS

Ponce de Leon et al. "Redox Flow Cells for Energy Conversion", Journal of Power Sources 160, May 26, 2006, pp. 716-732.
(Continued)

*Primary Examiner* — Ula C Ruddock
*Assistant Examiner* — Matthew W Van Oudenaren
(74) *Attorney, Agent, or Firm* — O'Shea Getz P.C.

(57) ABSTRACT

A method and system for storing and/or discharging electrical energy that has a cost, which method includes steps of: (a) providing a flow battery system comprising at least one flow battery cell and a controller; (b) operating the flow battery cell at a power density having a first value; and (c) changing the power density at which the flow battery cell is operated from the first value to a second value as a function of the cost of the electrical energy, wherein the power density is changed using the controller, and wherein the second value is different than the first value.

9 Claims, 3 Drawing Sheets

(51) Int. Cl.
*H02J 3/32* (2006.01)
*H01M 8/04858* (2016.01)
*H01M 8/04992* (2016.01)
*H01M 10/48* (2006.01)
*H01M 10/44* (2006.01)

(52) U.S. Cl.
CPC ............ *H01M 8/20* (2013.01); *H02J 3/32* (2013.01); *H01M 10/44* (2013.01); *H01M 10/48* (2013.01); *H01M 10/484* (2013.01); *H01M 2250/10* (2013.01); *H01M 2250/402* (2013.01); *Y02B 90/12* (2013.01); *Y02B 90/14* (2013.01); *Y02E 60/528* (2013.01)

(58) Field of Classification Search
CPC ............ H01M 10/484; H01M 10/48; H01M 2250/402; H01M 2250/10; H02J 3/32
See application file for complete search history.

(56) References Cited

U.S. PATENT DOCUMENTS

| | | | |
|---|---|---|---|
| 7,265,456 | B2 | 9/2007 | Hennessy |
| 7,353,083 | B2 | 4/2008 | Hennessy |
| 7,438,986 | B2 | 10/2008 | Shimotori et al. |
| 7,473,485 | B2 | 1/2009 | Burlatsky et al. |
| 2003/0207156 | A1 | 11/2003 | Ovshinsky et al. |
| 2004/0174072 | A1 | 9/2004 | Bourilkov et al. |
| 2004/0202914 | A1* | 10/2004 | Sridhar ............... C01B 3/34 429/411 |
| 2005/0156431 | A1* | 7/2005 | Hennessy ............ F03D 9/00 290/44 |
| 2006/0172178 | A1 | 8/2006 | Hashizume et al. |
| 2007/0157922 | A1 | 7/2007 | Radhakrishnan et al. |
| 2007/0287043 | A1 | 12/2007 | Marsh et al. |
| 2008/0090129 | A1 | 4/2008 | Kunz et al. |
| 2008/0124602 | A1 | 5/2008 | Larsen et al. |
| 2008/0292964 | A1* | 11/2008 | Kazacos ............ B60L 11/1879 429/231.5 |
| 2009/0014059 | A1 | 1/2009 | Radhakrishnan et al. |
| 2009/0153102 | A1* | 6/2009 | Guatto ............ H01M 10/4207 320/128 |
| 2009/0326729 | A1 | 12/2009 | Hakim et al. |
| 2010/0003586 | A1 | 1/2010 | Sahu |
| 2010/0104904 | A1 | 4/2010 | Rao et al. |
| 2010/0143809 | A1 | 6/2010 | Perry et al. |
| 2010/0216038 | A1 | 8/2010 | Cardenas-Valencia et al. |
| 2010/0326075 | A1 | 12/2010 | Fong et al. |
| 2011/0109158 | A1* | 5/2011 | Olsen ............... B60L 3/0069 307/10.1 |
| 2011/0121781 | A1 | 5/2011 | Burke et al. |
| 2011/0288691 | A1 | 11/2011 | Keiko et al. |
| 2012/0270122 | A1 | 10/2012 | Jensen et al. |

OTHER PUBLICATIONS

Wells, "Solar Microgrids to Accommodate Renewable Intermittency", Transmission and Distribution Conference and Exposition, Apr. 19, 2010, pp. 1-9.

* cited by examiner

METHOD AND SYSTEM FOR OPERATING A FLOW BATTERY SYSTEM BASED ON ENERGY COSTS

CROSS-REFERENCE TO RELATED APPLICATIONS

This application is a divisional application of U.S. patent application Ser. No. 13/022,285 filed Feb. 7, 2011, which is related to PCT/US09/68681 filed on Dec. 18, 2009.

BACKGROUND

1. Technical Field

This disclosure relates generally to a flow battery system and, more particularly, to a method for operating a flow battery system based on energy costs.

2. Background Information

A typical flow battery system is configured to store and discharge electrical energy. Such a flow battery system, for example, can convert electrical energy generated by a power source into chemical energy, which is stored within a pair of anolyte and catholyte solutions. The flow battery system can later convert the stored chemical energy back into an electrical energy form that can be transferred and used outside of the flow battery system.

Flow battery systems are typically operated at substantially constant and relatively high round trip efficiencies in an effort to maximize net revenue by minimizing operational costs. The term "round trip efficiency" is used herein to describe an efficiency of converting electrical energy to chemical energy, storing the chemical energy, and converting the chemical energy back into electrical energy. The operational costs can be minimized at relatively high round trip efficiencies because the ratio of (i) electrical energy purchased for storage to (ii) electrical energy discharged and sold typically decreases as the round trip efficiency increases. The operation of a flow battery system at such a relatively high round trip efficiency, however, does not account for fluctuations in electrical energy costs. The term "energy costs" or "cost of energy" is used herein to describe a net monetary cost of electrical energy.

Energy costs can be influenced by various factors such as time of day and consumer energy demand. The cost of energy during a typical day, for example, will vary between peak hours (e.g., when consumer demand is at a peak) and non-peak hours (e.g., when consumer demand is at a low).

Energy costs can also be influenced by other factors such as energy surplus. An energy surplus is created when a quantity of electrical energy generated by one or more power sources is greater than the consumer energy demand. The net cost of energy for an operator of a wind turbine can be relatively low or even negative during nighttime hours, for example, when public utilities pay the operator to reduce or cease the wind turbine output to the public power grid when there is an energy surplus thereon.

DETAILED DESCRIPTION

Figure 1:
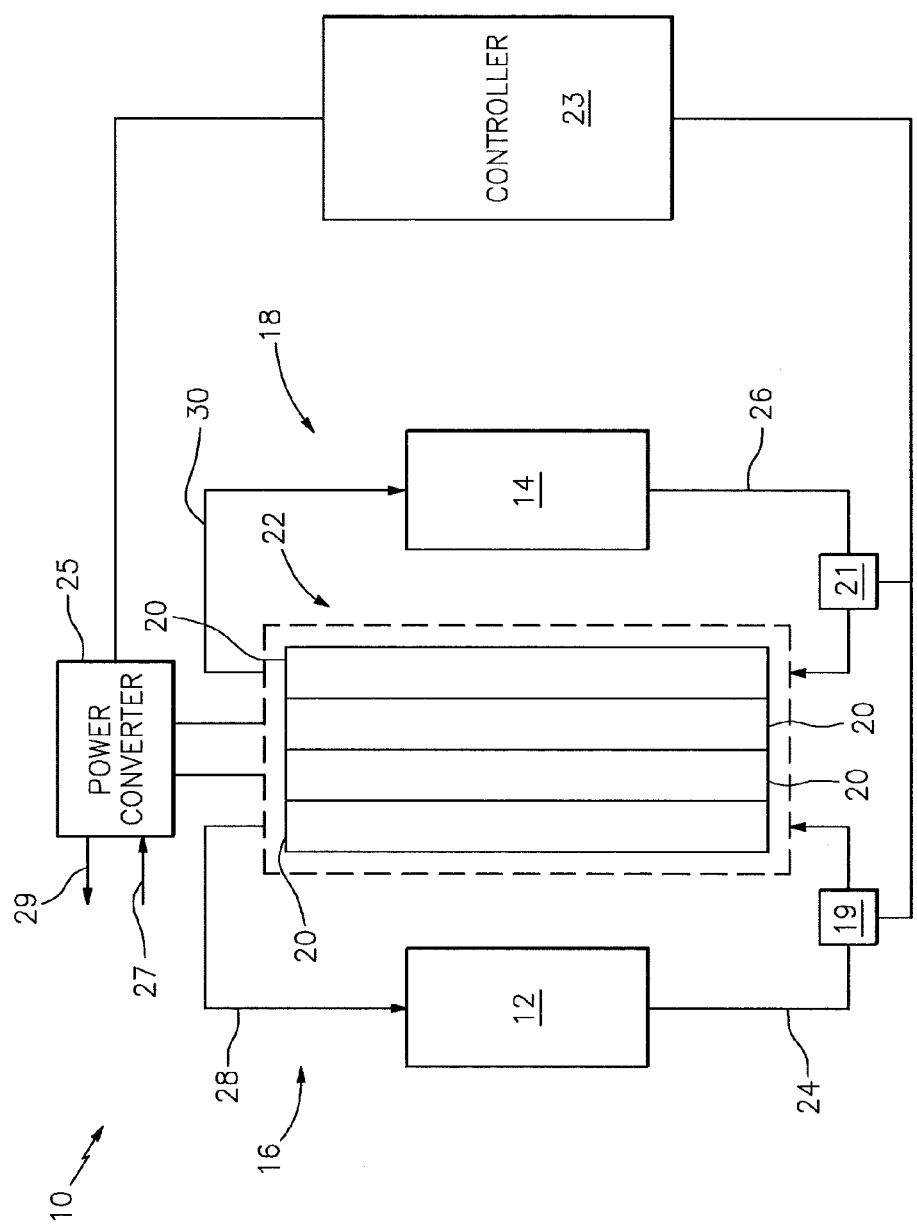
FIG. 1 is a schematic diagram of one embodiment of a flow battery system, which includes one or more flow battery cells arranged in a stack.

Referring to FIG. 1, a schematic diagram is shown of a flow battery system 10. The present flow battery system 10 is configured to store and/or discharge electrical energy as a function of the cost of the electrical energy. The flow battery system 10 includes a first electrolyte storage tank 12, a second electrolyte storage tank 14, a first electrolyte circuit loop 16, a second electrolyte circuit loop 18, a first flow regulator 19, a second flow regulator 21, one or more flow battery cells 20 arranged in a stack 22, a power converter 25, and a controller 23.

The first and second electrolyte storage tanks 12 and 14 are each adapted to hold and store one of a pair of electrolyte solutions (e.g., an anolyte solution or a catholyte solution). Examples of suitable electrolyte solution pairs include vanadium and vanadium solutions, bromine and polysulphide solutions, vanadium and bromide solutions, etc.

The first and second electrolyte circuit loops 16 and 18 each have a source conduit 24, 26, and a return conduit 28, 30, respectively.

The first and second flow regulators 19 and 21 are each adapted to selectively regulate flow of one of the electrolyte solutions through a respective one of the electrolyte circuit loops 16, 18 in response to a respective regulator control signal. Each flow regulator 19, 21 can include a single device, such as a variable speed pump or an electronically actuated valve, or a plurality of such devices, depending upon the particular design requirements of the flow battery system. The present system 10, however, is not limited to any particular type of flow regulator.

Figure 2:
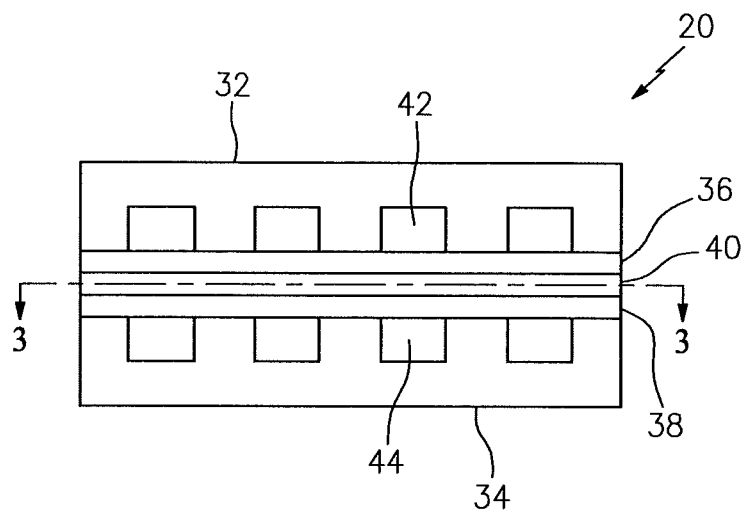
FIG. 2 is a diagrammatic illustration of one embodiment of one of the flow battery cells in FIG. 1.
Figure 3:
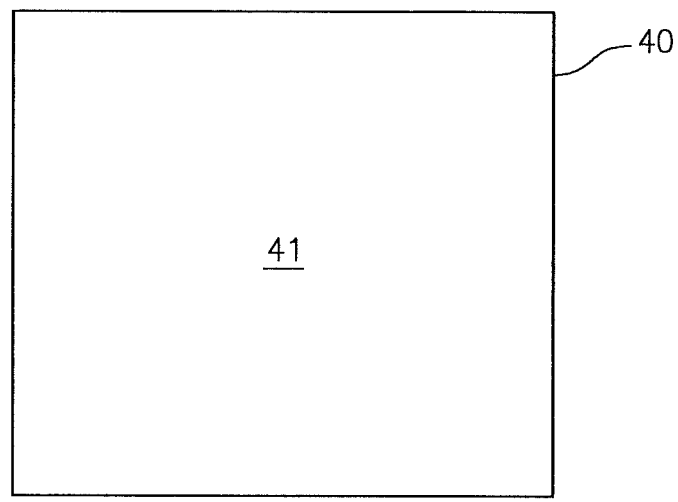
FIG. 3 is a cross-sectional diagrammatic illustration of the flow battery cell in FIG. 2.

Referring to FIG. 2, each flow battery cell 20 includes a first current collector 32, a second current collector 34, a first liquid-porous electrode layer 36 (hereinafter "first electrode layer"), a second liquid-porous electrode layer 38 (hereinafter "second electrode layer"), and an ion-exchange membrane 40. Referring to FIG. 3, the ion-exchange membrane 40 has a cross-sectional area 41. Referring again to FIG. 2, the ion-exchange membrane 40 is disposed between the first and second electrode layers 36 and 38. The first and second electrode layers 36 and 38 are disposed between the first and second current collectors 32 and 34. Examples of such a flow battery cell are disclosed in PCT Application No. PCT/US09/68681, which is incorporated by reference in its entirety.

Each flow battery cell 20 is configured to operate over a relatively wide range of round trip efficiencies (e.g., 40 to 90 percent), and a relatively wide range of power densities such as, for example, between x to approximately 50x mW/cm$^2$ (e.g., 20 to 1000 mW/cm$^2$), where "x" represents a power density value. The term "round trip efficiency" is used herein, as indicated above, to describe an efficiency of converting electrical energy to chemical energy, storing the chemical energy, and converting the chemical energy back into electrical energy. The term "power density" is used herein to describe a ratio of (i) electrical power delivered to or drawn from the stack 22 of flow battery cells 20 to (ii) a sum of the cross-sectional areas 41 (see FIG. 3) of the flow battery cells 20 in the stack 22.

Referring again to FIG. 1, the power converter 25 is adapted to selectively regulate (i) a rate at which the stack 22 of flow battery cells 20 receives electrical energy from an energy input 27, and (ii) a rate at which the stack 22 of flow battery cells 20 discharges electrical energy through an energy output 29, in response to a converter control signal. The power converter 25 can include a single two-way power converter or a pair of one-way power converters, depending upon the particular design requirements of the flow battery system. Examples of suitable power converters include a power inverter, a DC/DC converter connected to a DC bus, etc. The present system 10, however, is not limited to any particular type of power conversion or regulation device.

The controller 23 can be implemented by one skilled in the art using hardware, software, or a combination thereof. The hardware can include, for example, one or more processors, analog and/or digital circuitry, etc.

The controller 23 is configured to control the operation of the stack 22 of flow battery cells 20 as a function of various parameters including the cost of energy. In one embodiment, for example, the controller 23 is programmed to (i) track changes (i.e., increases and/or decreases) in the cost of energy, and (ii) control the power density and the round trip efficiency at which flow battery cells 20 are operated based, at least in part, on the tracked changes. The controller 23 can track changes in the cost of energy, for example, by (i) determining the cost of energy at various points in time using an energy cost schedule, and (ii) tracking how the costs of energy change as a function of time. A schedule, which can be implemented as a lookup table, correlating cost to purchase electrical energy from an energy source to time of day is an example of an energy cost schedule. The controller 23 can subsequently generate the converter and regulator control signals to periodically or continuously increase or decrease the power density and/or the round trip efficiency at which each flow battery cell 20 is operated based on the tracked changes in the cost of energy, which will be described below in further detail. The present controller, however, is not limited to the aforesaid embodiment. In alternate embodiments, for example, the controller 23 can operate the stack 22 of flow battery cells 20 at a certain predetermined power density (e.g., selected from a lookup table) that corresponds to an up-to-date value of the determined cost of energy; e.g., if the cost of energy is above, at or below a certain value, the power density is set to a certain corresponding value.

Referring to FIGS. 1 and 2, the first flow regulator 19 is disposed in line within the first electrolyte circuit loop 16. The source conduit 24 of the first electrolyte circuit loop 16 fluidly connects the first electrolyte storage tank 12 to one or both of the first current collector 32 and the first electrode layer 36 of each flow battery cell 20. The return conduit 28 of the first electrolyte circuit loop 16 reciprocally fluidly connects the first current collector 32 and/or the first electrode layer 36 of each flow battery cell 20 to the first electrolyte storage tank 12.

The second flow regulator 21 is disposed in line within the second electrolyte circuit loop 18. The source conduit 26 of the second electrolyte circuit loop 18 fluidly connects the second electrolyte storage tank 14 to one or both of the second current collector 34 and the second electrode layer 38 of each flow battery cell 20. The return conduit 30 of the second electrolyte circuit loop 18 reciprocally fluidly connects the second current collector 34 and/or the second electrode layer 38 of each flow battery cell 20 to the second electrolyte storage tank 14.

The controller 23 is in signal communication (e.g., hardwired or wirelessly connected) with the power converter 25, and the first and second flow regulators 19 and 21. The power converter 25 is electrically connected to the first and second current collectors 32 and 34 of each flow battery cell 20 in the stack 22.

Referring still to FIGS. 1 and 2, during operation of the flow battery system 10, a first electrolyte solution (e.g., a vanadium electrolyte solution, a bromine electrolyte solution, etc.) is circulated between the first electrolyte storage tank 12 and the flow battery cells 20 through the first electrolyte circuit loop 16. More particularly, the first flow regulator 19 controls the flow rate of the first electrolyte solution through the source conduit 24 of the first electrolyte circuit loop 16 to the first current collector 32 in each flow battery cell 20. The first electrolyte solution flows through channels 42 in the first current collector 32, and can permeate or flow into and out of the first electrode layer 36. The return conduit 28 of the first electrolyte circuit loop 16 directs the first electrolyte solution from the first current collector 32 of each flow battery cell 20 back to the first electrolyte storage tank 12.

A second electrolyte solution (e.g., a vanadium electrolyte solution, a polysulphide electrolyte solution, etc.) is circulated between the second electrolyte storage tank 14 and the flow battery cells 20 through the second electrolyte circuit loop 18. More particularly, the second flow regulator 21 controls the flow rate of the second electrolyte solution through the source conduit 26 of the second electrolyte circuit loop 18 to the second current collector 34 in each flow battery cell 20. The flow rates of the first and second electrolytic solutions are typically equal or relatively similar. The second electrolyte solution flows through channels 44 in the second current collector 34, and can permeate or flow into and out of the second electrode layer 38. The return conduit 30 of the second electrolyte circuit loop 18 directs the second electrolyte solution from the second current collector 34 of each flow battery cell 20 back to the second electrolyte storage tank 14.

The first and second electrolyte solutions electrochemically react in reversible reduction-oxidation ("redox") reactions as the solutions flow through the current collectors 32 and 34 and permeate or flow through the electrode layers 36 and 38. During an energy storage mode of operation, for example, ionic species (e.g., $H^+$, $Na^+$, etc.) are transferred from the first electrolyte solution to the second electrolyte solution across the ion-exchange membrane 40. The transfer of the ionic species converts electrical energy, received from a power source via the power converter 25 and input into each flow battery cell 20 through its current collectors 32 and 34, into chemical energy. The chemical energy is then stored in the electrolyte solutions, which are respectively stored in the first and second electrolyte storage tanks 12 and 14. During an energy discharge mode of operation, on the other hand, the ionic species are transferred from the second electrolyte solution to the first electrolyte solution. The transfer of the ionic species converts the chemical energy back to electrical energy. The regenerated electrical energy then passes out of each flow battery cell 20 through its current collectors 32 and 34, and can be distributed to outside of the flow battery system through the power converter 25.

The ionic species are transferred across the ion-exchange membrane 40 in each flow battery cell 20 according to a certain power density. The term "power density" is used herein, as indicated above, to describe a ratio of (i) electrical power delivered to or drawn from the stack 22 of flow battery cells 20 to (ii) a sum of the cross-sectional areas 41 (see FIG. 3) of the flow battery cells 20 in the stack 22. The power density is functionally related to the conversion rates of the reactants in the first and second electrolyte solutions that are circulated through flow battery cells 20. The controller 23, therefore, can change the power density at which the flow battery cells 20 are operated by increasing or decreasing the rate at which the flow battery cells 20 receive or discharge electrical energy using the power converter 25. The controller 23 can also increase or decrease the flow rates of the electrolyte solutions using the first and second flow regulators 19 and 21 such that a sufficient supply of reactants are delivered to the flow battery cells 20 to support the power density at which the cells are operated. Increasing or decreasing the power density, however, can also change the round trip efficiency of the flow battery system 10 and its net revenue.

The round trip efficiency of the flow battery system 10, as indicated above, is a measure of overall efficiency of the aforesaid processes of converting electrical energy to chemical energy, storing the chemical energy, and converting the chemical energy back into electrical energy. The round trip efficiency therefore is functionally related to (i) an efficiency at which the flow battery system 10 stores energy (hereinafter the "charge efficiency") and (ii) an efficiency at which the flow battery system 10 discharges energy (hereinafter the "discharge efficiency"). The round trip efficiency can be determined, for example, as follows:

$$\text{round trip efficiency} = (\text{charge efficiency}) \times (\text{discharge efficiency}).$$

Figure 4:
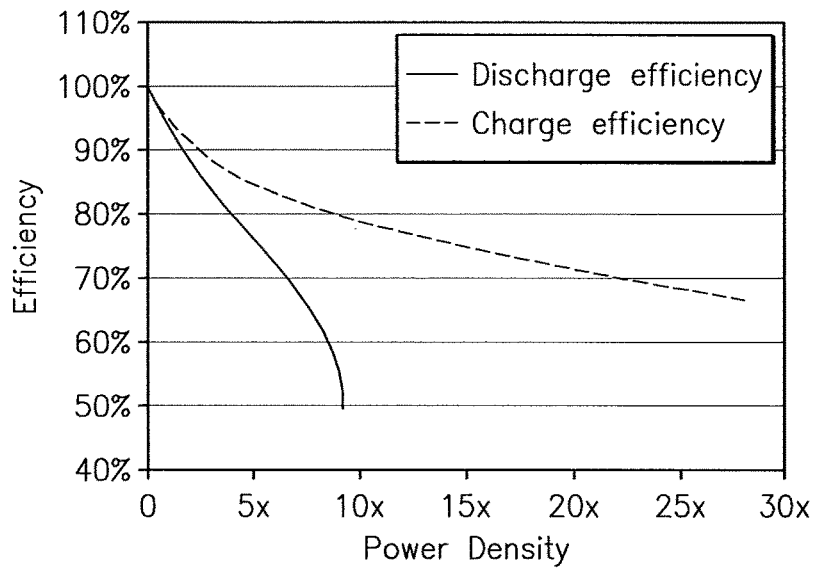
FIG. 4 graphically illustrates a functional relationship between over-potential efficiency and power density of a flow battery cell during energy storage (i.e., charge) and energy discharge modes of operation.

The charge and discharge efficiencies, as shown in FIG. 4, are each inversely related to the power density at which the flow battery cells 20 are operated; e.g., as the power density increases the charge and discharge efficiencies decrease. The round trip efficiency, therefore, is also inversely related to the power density at which the flow battery cells 20 are operated; e.g., as the power density increases the round trip efficiency decreases.

The net revenue of the flow battery system 10 is a function of a plurality of cost parameters. The cost parameters can include (i) the cost of energy input into the system 10 during the energy storage mode of operation, (ii) the cost to operate the flow battery system 10 during the energy storage and discharge modes of operation, and (iii) the value of energy discharged from the system 10 during the energy discharge mode of operation. The cost of energy during the energy storage mode of operation is related to the cost paid by a flow battery system operator to purchase or produce the energy stored in the flow battery system. The cost to operate the flow battery system during the energy storage and discharge modes of operation is inversely related to the round trip efficiency of the flow battery system and, thus, the charge and discharge efficiencies. The value of energy discharged from the system 10 during the energy discharge mode of operation is related to a value at which the discharged energy can be sold (i.e., a local market cost of energy during a time period when energy is discharged from the flow battery system) or a savings that results from not having to purchase energy from a supplier (i.e., the cost of energy to a consumer). The net revenue can be determined, for example, as follows:

$$\text{net revenue} = (\text{value of discharged energy}) - (\text{cost to store energy}) - (\text{cost to operate}).$$

A decrease in the round trip efficiency caused by an increase in the power density can also decrease the net revenue of the flow battery system 10 since more energy must be purchased for a given amount of energy delivered or discharged (i.e., the cost to store energy increases). Such a decrease in the round trip efficiency, however, can be mitigated when the cost of energy during the energy storage mode of operation is relatively low, and/or when the value of discharged energy during the energy discharge mode of operation is relatively high; e.g., when the flow battery system operator pays a relatively small amount for the stored energy, and is paid a relatively large amount by consumers for the use of the discharged energy. Conversely, a relatively high energy cost during the energy storage mode of operation and/or a relatively low value of the discharged energy during the energy discharge mode of operation can be mitigated by decreasing the power density to decrease the cost to operate the flow battery system. The controller 23, therefore, is programmed to continuously or periodically regulate the operation of the system based on parameters including the cost of electrical energy; e.g., control the power density at which the flow battery cells 20 are operated as a function of the cost of energy. In this manner, the controller 23 can increase the net revenue of the flow battery system 10 as compared to conventional flow battery systems, which operate at constant, or relatively narrow power density ranges (e.g., 20 to 100 mW/cm$^2$).

Figure 5:
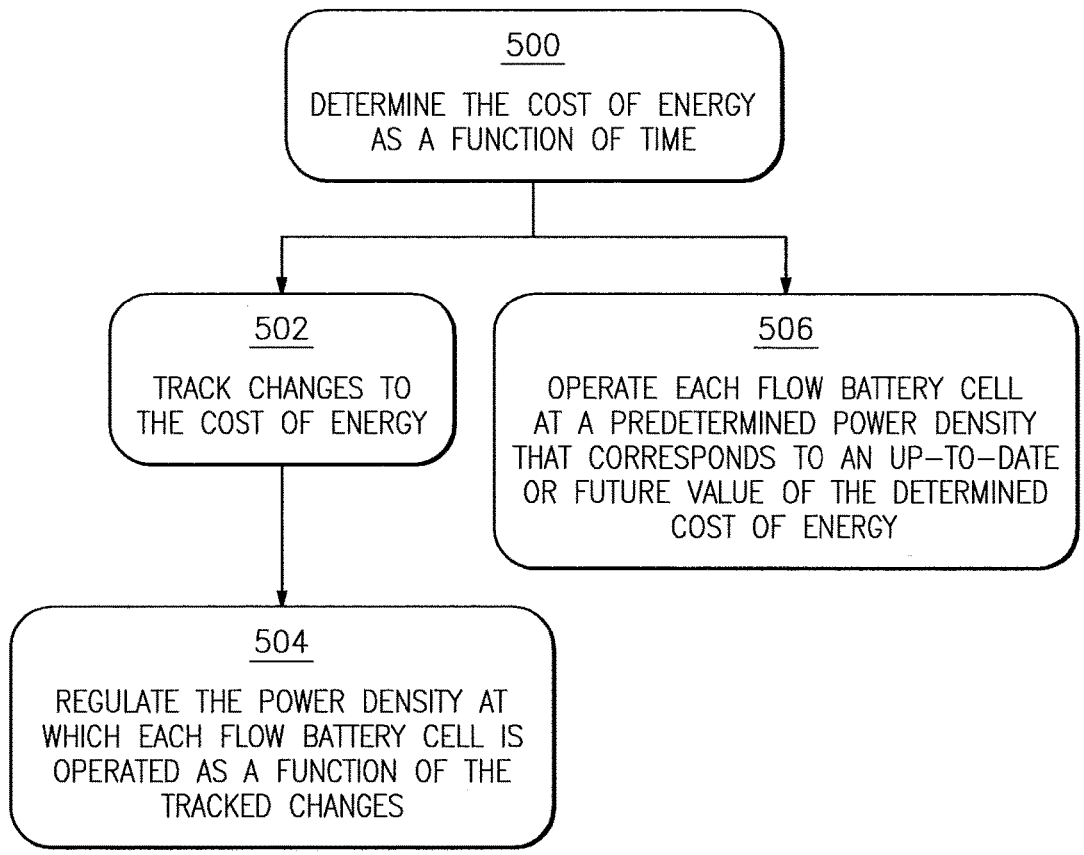
FIG. 5 is a flow chart showing a method for operating the flow battery system in FIG. 1.

Referring to FIG. 5, the controller 23 can be adapted to determine the cost of energy at various points in time during its operation (see step 500). The cost of energy at each point in time can be determined, for example, using an energy cost schedule. In some embodiments, the controller 23 can also predict how the cost of energy will likely change at future points in time using the energy cost schedule or any suitable algorithm (e.g., an algorithm based on a wind speed forecast where the flow battery system stores energy generated by wind turbines). The controller 23 tracks changes in the cost of energy to determine whether the cost of energy has or will increase or decrease (see step 502). The controller 23 subsequently regulates the power density at which each flow battery cell 20 is operated based on the tracked changes (see step 504). In an alternative embodiment, the controller 23 can operate each flow battery cell 20 at a certain predetermined power density (e.g., selected from a lookup table) that corresponds to an up-to-date or future value of the determined cost of energy (see step 506); e.g., if the cost of energy is above, at or below a certain value, the power density is set to a certain corresponding value.

During the energy storage mode of operation, the controller 23 increases the power density at which the flow battery cells 20 are operated to a relatively high value (e.g., approximately 1000 mW/cm$^2$; ~6452 mW/in$^2$) when the cost of electrical energy decreases to a relatively low value (e.g., during nonpeak hours). Such an increase in the power density decreases the charge efficiency (e.g., <approximately 80 percent) of the flow battery system 10 and, thus, increases the cost to operate the flow battery system. The increased cost to operate the flow battery system 10, however, can be mitigated by storing a relatively large quantity of energy (i.e., operating at a relatively high power density) that is purchased at a relatively low cost.

Still during the aforesaid energy storage mode of operation, the controller 23 decreases the power density at which the flow battery cells 20 are operated to a relatively low value (e.g., to approximately 20 mW/cm$^2$; ~129 mW/in$^2$) when the cost of electrical energy increases to a relatively high value (e.g., during peak hours). Such a decrease in power density increases the charge efficiency (e.g., ≥approximately 90 percent) of the flow battery system 10 and, thus, decreases the cost to operate the flow battery system. The relatively high cost paid to input the energy stored in the flow battery system therefore can be mitigated by decreasing the cost to operate the flow battery system. In some embodiments, the controller 23 can also turn off the energy storage mode of operation when the cost of energy is above a maximum level.

Similarly, during the energy discharge mode of operation, the controller 23 increases the power density at which the flow battery cells 20 are operated to a relatively high value when the value of the discharged electrical energy increases to a relatively high value (e.g., during peak hours). Such an increase in the power density decreases the discharge efficiency of the flow battery system 10 and, thus, increases the cost to operate the flow battery system. The increased cost to operate the flow battery system, however, can be mitigated by discharging a relatively large quantity of energy (i.e., operating at a relative high power density) when the value of the electrical energy is relatively high.

Still during the aforesaid energy discharge mode of operation, the controller 23 decreases the power density at which the flow battery cells 20 are operated to a relatively low value when the value of the discharged electrical energy decreases to a relatively low value (e.g., during nonpeak hours). Such a decrease in the power density increases the discharge efficiency of the flow battery system 10 and, thus, decreases the cost to operate the flow battery system. The relatively low value of the discharged electrical energy therefore can be mitigated by decreasing the cost to operate the flow battery system. In some embodiments, the controller 23 can also turn off the energy discharge mode of operation when the cost of energy is below a minimum level.

The flow battery cells 20 can be operated at substantially equal or different power densities and/or efficiencies during the energy storage and discharge modes of operation. The controller 23 can decrease the power density and, thus, increase the charge efficiency, for example, during nighttime hours when the flow battery system 10 has a relatively long period of time to charge. The controller 23 can increase the power density and, thus, decrease the discharge efficiency, on the other hand, during peak hours when there is a relatively high consumer energy demand.

The controller 23 can operate the flow battery cells 20, as indicated above, over a relatively wide range of power densities such as, for example, between x to 50x $mW/cm^2$ (e.g., 20 to 1000 $mW/cm^2$). In other embodiments, however, the controller 23 can operate the flow battery cells 20 over a smaller range of power densities such as, for example, between x to 10-20x (e.g., 20 to 200-400 $mW/cm^2$).

In some embodiments, the controller 23 can operate the flow battery cells 20 over a relatively wide range of charge and/or discharge efficiencies such as, for example, between fifty and ninety-five percent (50-95%). In other embodiments, the controller 23 can operate the flow battery cell 20 over a smaller range of round trip efficiencies such, for example, between eighty to ninety percent (80-90%).

In some embodiments, the flow battery system 10 can be operated in conjunction with a wind turbine (not shown). The controller 23 can increase the power density at which the flow battery cells 20 are operated in order to store a relatively large quantity of electrical energy during nighttime hours when, for example, a public utility would otherwise pay the turbine operator to reduce or cease the turbine output to the public power grid.

In some embodiments, the flow battery system 10 can be operated by a consumer. The controller 23 can increase the power density at which the flow battery cells 20 are operated to a maximum (or highest possible) value during the energy discharge mode of operation, for example, to avoid or offset inflated energy costs or peak-demand charges during peak hours.

While various embodiments of the flow battery system have been disclosed, it will be apparent to those of ordinary skill in the art that many more embodiments and implementations are possible. Accordingly, the disclosed flow battery system and method of operation are not to be restricted except in light of the attached claims and their equivalents.

What is claimed is:

1. A flow battery system for at least one of storing and discharging electrical energy that has a cost, comprising
    one or more flow battery cells, each adapted to operate at a power density; and
    a controller programmed to change the power density at which the flow battery cells operate over a range between a first power density value and a second power density value as a function of the cost of the electrical energy,
    wherein the second power density value is between ten and fifty times larger than the first power density value.

2. The flow battery system of claim 1, wherein the controller is programmed to change the power density at which the flow battery cells are operated during an energy storage mode of operation by:
    increasing the power density when the cost of the electrical energy is decreasing; and
    decreasing the power density when the cost of the electrical energy is increasing.

3. The flow battery system of claim 1, wherein the controller is programmed to change the power density at which the flow battery cells are operated during an energy discharge mode of operation by:
    increasing the power density when the cost of the electrical energy is increasing; and
    decreasing the power density when the cost of the electrical energy is decreasing.

4. The flow battery system of claim 1, wherein the controller is programmed to change the power density from a third power density value to a fourth power density value when the cost of the electrical energy is one of greater than, equal to, and less than a certain predetermined value, wherein the third power density value is different than the fourth power density value.

5. The flow battery system of claim 1, wherein
    the controller is programmed to change the power density at which the flow battery cells are operated to a third power density value during peak hours; and
    the controller is programmed to change the power density at which the flow battery cells are operated to a fourth power density value during nonpeak hours, wherein the fourth power density value is different than the third power density value.

6. The flow battery system of claim 1, further comprising a power converter connected to the flow battery cells, wherein the controller is programmed to change the power density at which the flow battery cells are operated by controlling operation of the power converter.

7. The flow battery system of claim 1, Wherein the first power density value is equal to 20 $mW/cm^2$ and the second power density value is equal to 1000 $mW/cm^2$.

8. The flow battery system of claim 1, Wherein the first power density value is equal to 20 $mW/cm^2$ and the second power density value is equal to 200 $mW/cm^2$.

9. The flow battery system of claim 1, wherein the first power density value is equal to 20 mW/cm$^2$ and the second power density value is equal to 400 mW/cm$^2$.

* * * * *